US006877752B2

(12) United States Patent
Edwards

(10) Patent No.: US 6,877,752 B2
(45) Date of Patent: Apr. 12, 2005

(54) REMOVABLE LARGE WHEEL ASSEMBLY FOR LUGGAGE WITH SMALL WHEELS

(76) Inventor: Anthony G. Edwards, 13700 Tahiti Way #153, Marina Del Rey, CA (US) 90292

( * ) Notice: Subject to any disclaimer, the term of this patent is extended or adjusted under 35 U.S.C. 154(b) by 0 days.

(21) Appl. No.: 10/059,793

(22) Filed: Jan. 29, 2002

(65) Prior Publication Data

US 2003/0141684 A1 Jul. 31, 2003

(51) Int. Cl.[7] .................................................. B62B 1/00
(52) U.S. Cl. ........................ 280/37; 280/47.2; 190/18 A
(58) Field of Search ............................. 280/47.17, 47.2, 280/47.24, 37, 652, 655, 655.1; 190/18 A, 109; 301/1

(56) References Cited

U.S. PATENT DOCUMENTS

| 2,493,824 A | * | 1/1950 | Noros | |
|---|---|---|---|---|
| 2,919,138 A | * | 12/1959 | Brower et al. | 280/37 |
| 3,087,740 A | * | 4/1963 | Mitty et al. | |
| 3,889,966 A | * | 6/1975 | Zeitlin | 190/18 A X |
| 3,989,128 A | * | 11/1976 | Walker | 190/18 A |
| 3,997,038 A | * | 12/1976 | Walker | 190/18 A |
| 4,076,319 A | * | 2/1978 | Walker | 301/1 |
| 4,758,009 A | * | 7/1988 | Abel | 190/18 A X |
| 4,900,043 A | * | 2/1990 | Kho | 280/37 |
| 5,944,155 A | * | 8/1999 | Geary | 190/18 A X |
| 5,984,154 A | * | 11/1999 | Scicluna | |
| 6,253,892 B1 | * | 7/2001 | Edwards | 190/18 A |
| 6,561,327 B1 | * | 5/2003 | Godshaw | 190/18 A |
| 2003/0042711 A1 | * | 3/2003 | Hsu | |

FOREIGN PATENT DOCUMENTS

| DE | 4042175 | * | 7/1992 |
|---|---|---|---|
| GB | 2276148 | * | 9/1994 |

* cited by examiner

Primary Examiner—Bryan Fischmann

(57) ABSTRACT

Removable large wheels for a luggage case, having two permanent sleeves inserted in holes drilled in pre-existing mounting blocks which contain pre-existing small wheels. Two axles, one in each of the sleeves, with a permanent stop at the inner end of each axle and a fastener at the outer end of each axle. The large wheels have an extended tubular part at the hub of the inner side of each wheel which prevents the wheel from touching the outer edge of the luggage. The axle can be extended outward to accept the large wheel, which is kept in place by a fastener at the outer end of each axle; or, when not in use, the axle can be retracted back into the sleeve and the wheels stored in pockets on the exterior of the luggage case. The axles are prevented from sliding part way back out of the sleeves by a fastener at a point just outside the inner end of the sleeve, and kept from slipping all the way out by a stop which is permanently affixed to the inner end of the axle and is of the same diameter as the sleeve.

4 Claims, 3 Drawing Sheets

REMOVABLE LARGE WHEEL ASSEMBLY FOR LUGGAGE WITH SMALL WHEELS

BACKGROUND OF THE INVENTION

At the present time, carry-on luggage for travel by aircraft is usually provided with wheels to aid in their transport and improve mobility. Such wheels are restricted in size to allow maximum size for the luggage itself which is limited in extent by the airlines. For example, United Airlines restricts carry-on luggage to 22 by 14 by 9 inches. American Airlines restricts carry-on luggage to 23 by 13 by 9 inches. British Airlines restricts carry-on luggage to 22 by 16 by 8 inches.

Even larger luggage which must be checked is generally provided with relatively small wheels to allow maximum size for the luggage case. Such larger luggage, even with a front set of wheels and a back set of wheels can be unstable and can be easily overturned when being pulled or pushed in their transport.

Accordingly, there is a need for means providing such luggage with larger wheels for greater mobility and ease in transport but which can be removed when no longer needed so that carry-on luggage will meet airline size requirements and larger luggage can be checked in the usual manner.

Applicant is unaware of any prior art providing for a removable large wheel which can be added to small wheeled carry-on luggage or larger luggage which must be checked and then removed just before boarding aircraft or just before checking larger luggage.

OBJECT OF THE INVENTION

An object of the invention is to provide large wheels which can be added to and removed from a luggage case having relatively small wheels so that the luggage case can be more easily transported and rendered more mobile.

Another object of the invention is to provide large removable wheels which, after being removed from luggage having small wheels, can be stored either inside such luggage or in outside containers attached to the luggage.

BRIEF SUMMARY OF THE INVENTION

The present invention provides two large wheels, two sleeves to be inserted through holes in the small wheel mounting blocks, and two small axles inserted in those sleeves, with a fastener at the outer end of each axle and a stop affixed to the inner end of each axle to maintain the wheels in place when installed on the axles.

The small wheel mounting blocks of the carry-on luggage case are drilled with appropriate size holes to accept the sleeves which support the axles which hold the large wheels. Each axle has a fastener at the outer end and a stop on the inner end to hold the large wheel in place when the wheel is installed. Each axle is long enough to accept the large wheel when extended. Each axle is prevented from leaving the sleeve by the stop on the inner end of the axle.

The large wheels are removed by removing fasteners and then the large wheels.

DETAILED DESCRIPTION OF THE PREFERRED EMBODIMENT

Figure 1:
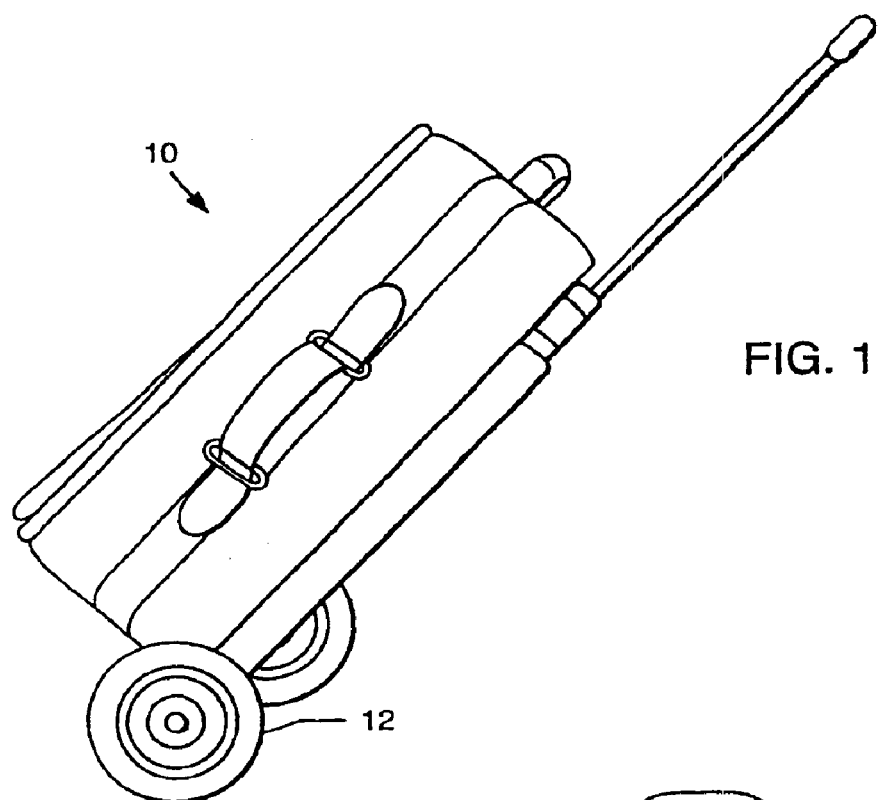
FIG. 1 is a perspective view of an embodiment of the invention showing a carry-on luggage case with a large wheel installed.

As shown in the drawings, a preferred embodiment of the invention has a carry-on luggage case 10 (FIG. 1) with removable large wheels in place. Luggage case 10 has a pouch or pockets attached to the exterior side thereof to receive the two large wheels 12 when they are uninstalled.

The luggage case 10 is provided with small wheels 11 secured to the bottom portion of the luggage case 10 in mounting blocks 13. Holes are drilled in the mounting blocks 13 to permanently contain the sleeves 14 which support the axles 15. The sleeves 14 which support the axles 15 are concealed horizontally within the small wheel mounting blocks 13 and are not visible but are indicated by dotted lines at 14 in FIGS. 2, 3, and 4.

The sleeves 14 hold the axles 15. The axles 15 hold the large wheels 12. The large wheels 12 are formed with inward-projecting tubular extensions 16 which serve to space the large wheels 12 away from the exterior sides of the luggage case so that they do not rub against the luggage case 10 as they roll. Thus, tubular molded extensions 16 (shown in FIGS. 2, 3, and 4) prevent the wheels from touching the sides of the luggage case when installed.

Fasteners 17 at the ends of axles 15 keep the large wheels 12 from falling off of the axles 15. The large wheels 12 can be held in place by many kinds of fasteners, such as a pin inserted through a hole in the outer end of the axle 15.

Figure 2:
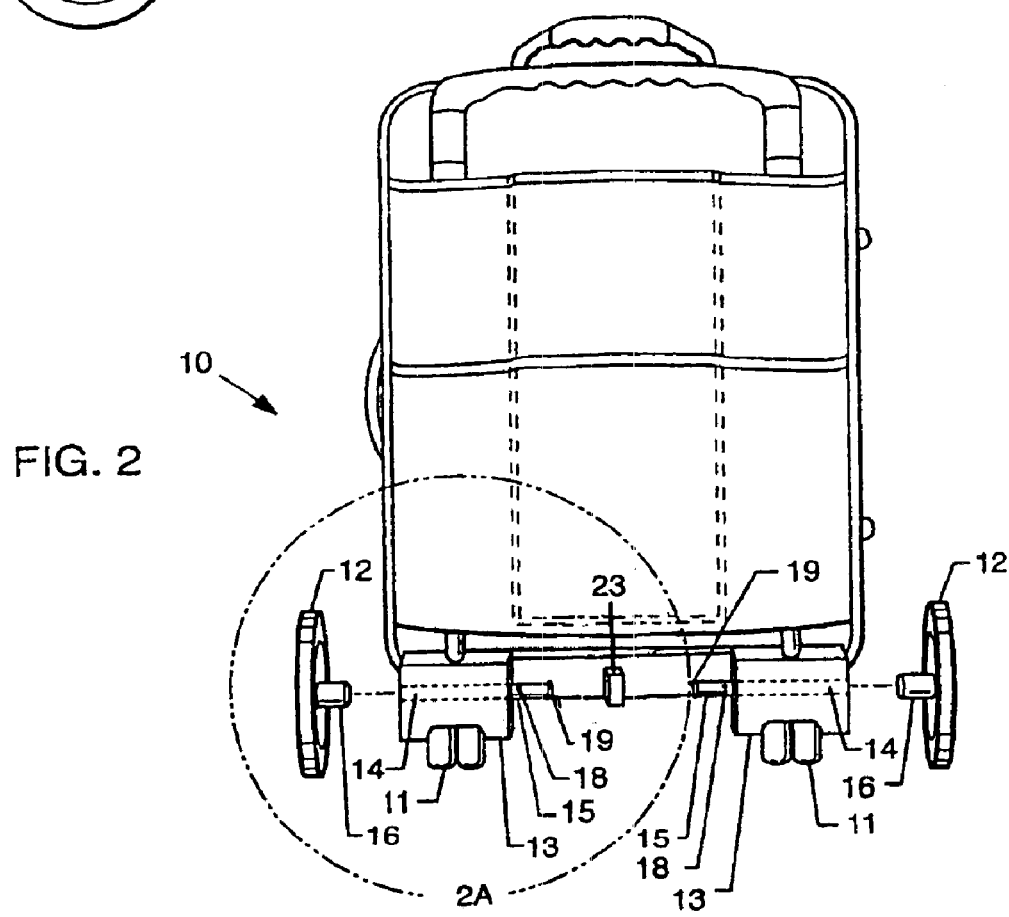
FIG. 2 is an exploded rear elevational view of the large wheels ready to be installed on the luggage case.
Figure 2A:
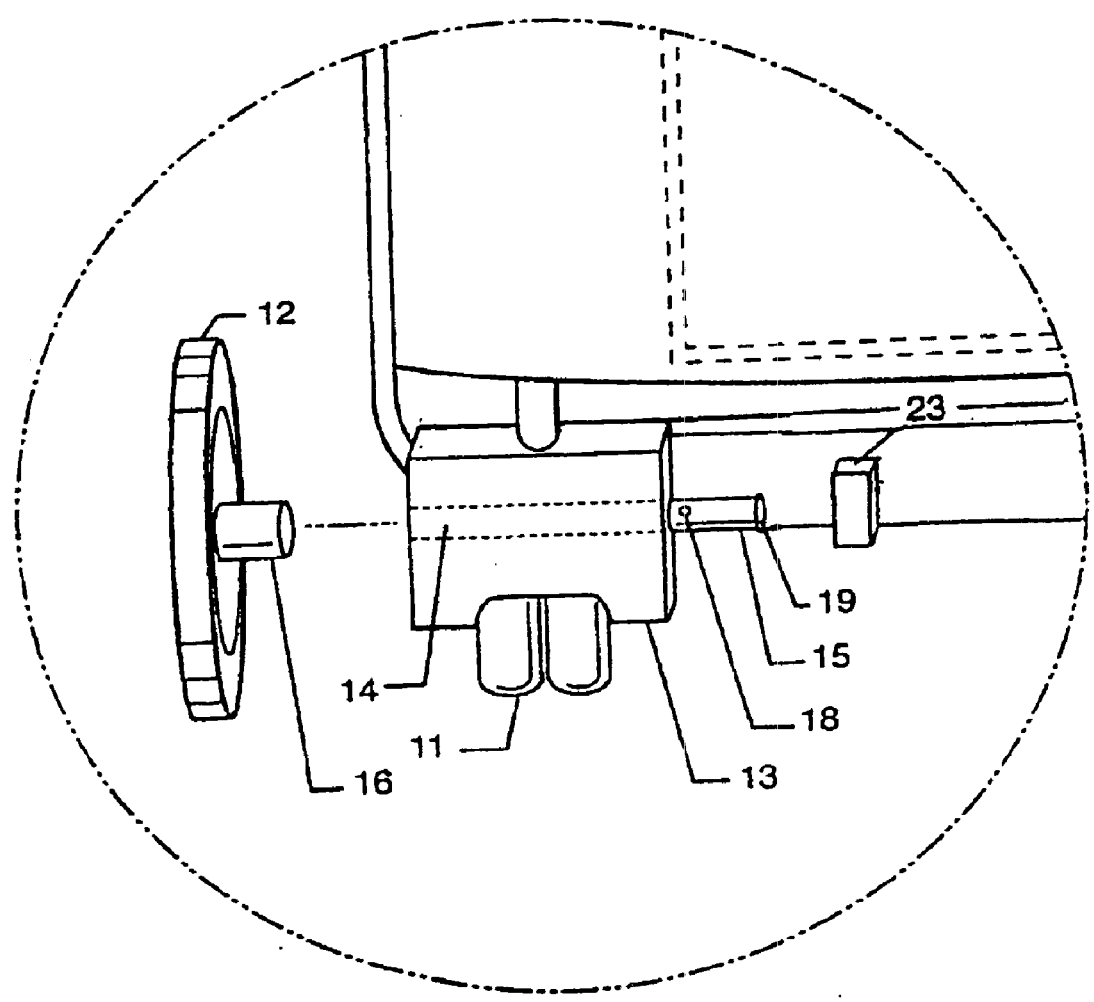
FIG. 2A is an enlargement of a portion of the view of FIG. 2.

The large wheels 12 may remain mounted on the axles 15 at all times, but if it becomes necessary to remove the large wheels 12 they are easily uninstalled by removing fasteners 17, removing the large wheels 12, and manually retracting the axles 15 back into the sleeves 14 where they are prevented from slipping back partway out of the sleeves by fasteners 18 (seen in FIGS. 2A and 2 on the inner side of mounting blocks 13).

The axles 15 are prevented from slipping all the way out of the sleeves 14 by stops 19 (seen in FIGS. 2A and 2) which are permanently affixed to the inner ends of axles 15 and are of the same diameter as sleeves 14. The axles 15 are further prevented from leaving the sleeves 14 in the inward direction by stop 23 which is placed in such a position in the path of the retracting axles 15 as to permit them to retract sufficiently back into the sleeves 14 but prevent the axles 15 from leaving the sleeves 14 completely.

Figure 3:
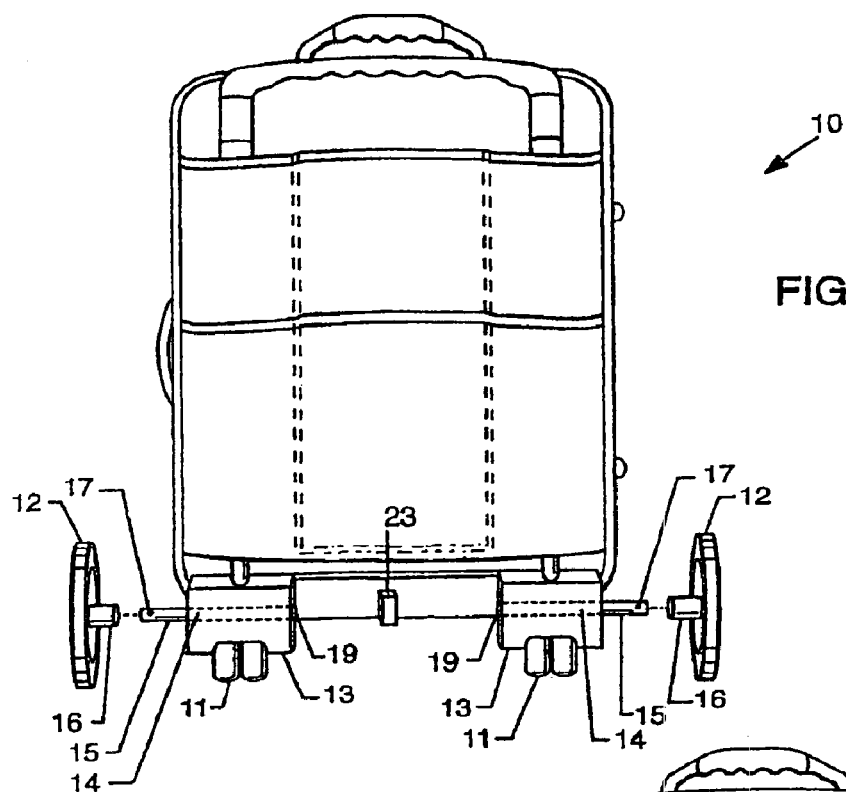
FIG. 3 is a rear elevational view of an embodiment of the invention showing a carry-on luggage case with a large wheel in exploded view showing the axles extended and ready for installation of the wheels.
Figure 4:
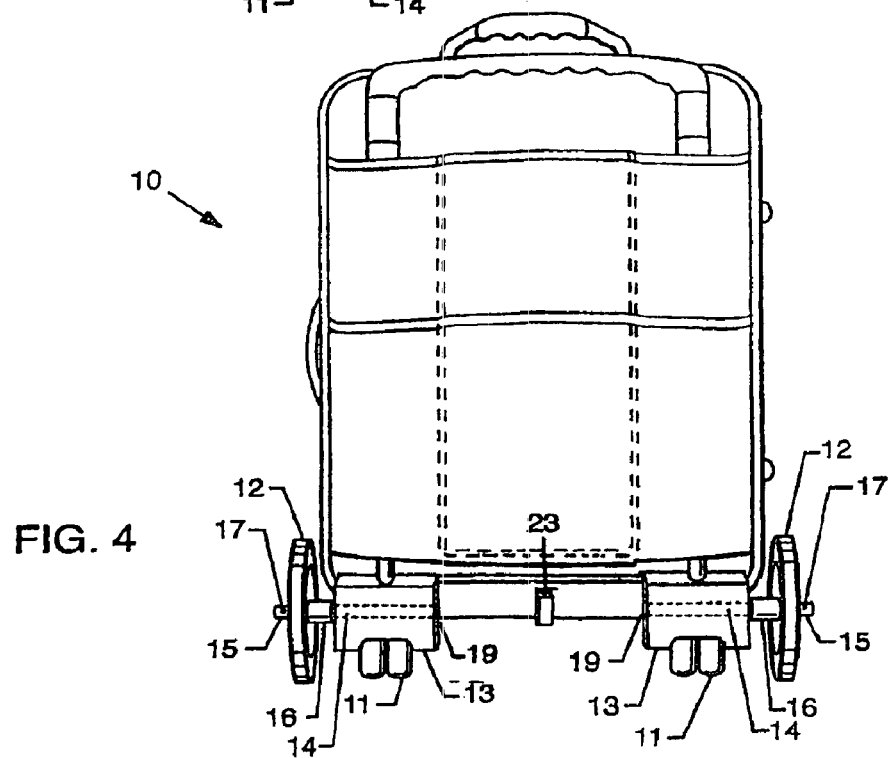
FIG. 4 is a rear elevational view of an embodiment of the invention showing a carry-on luggage case with the large wheels installed.

FIG. 3 shows luggage case 10 with axles 15 extended ready to install large wheels 12. Large wheels 12 are installed. Fasteners 17 maintain the large wheels 12 on the axles 15.

To reinstall the large wheels 12, fasteners 18 are removed and the axles 15 are manually pushed back out of the sleeves 14, so they are ready for installation of the large wheels 12.

Although the invention is not limited to a particular size of large wheel 12, the preferred size is between 4 and 10 inches. The small wheels 11 of most luggage, whether carry-on or not, generally range from 2 to 3 inches in diameter. The diameter of axle 15 is preferably about ⅜ inch but may vary plus or minus ⅛ inch or more so long as it has enough strength to support the luggage case 10 and its contents.

Large wheels 12 may be made of any suitable material such as ABS plastic or nylon or metal with a co-injected rubber tread portion.

Although I have described the invention in detail with reference to the accompanying drawings illustrating a preferred embodiment of the invention, it is understood that numerous changes may be made in the details of construction and arrangement of parts without departing from the spirit and scope of the invention as hereinafter claimed.

What is claimed is:

1. In a luggage case provided with small wheels mounted on small wheel mounting blocks located at the bottom of said luggage case, said luggage case having an outside pocket on the exterior side of said luggage case, the improvement comprising:

a plurality of holes drilled in the small wheel mounting blocks located at the bottom of said luggage case;

two sleeves inserted permanently in said holes in said mounting blocks, two small axles being inserted into said sleeves of said mounting blocks;

two large wheels, each with a molded extension at the hub thereof of sufficient length to prevent each large wheel from contacting the outer edge of the luggage case when installed;

and a fastener located at the outer end of each of said axles to secure each said large wheel in position, whereby the luggage case may be moved on the large wheels with the small wheels in place on the mounting blocks.

2. A luggage case with small wheels and removable large wheels, comprising:

a luggage case having a bottom;

a plurality of mounting blocks attached to said bottom;

a sleeve permanently inserted in each of said mounting blocks;

an axle inserted into each of said sleeves;

a large wheel mountable on each of said axles, each said large wheel having a molded extension at the hub thereof to prevent said large wheel from touching the outer edge of the luggage case when inserted at the outer end of each axle; and a fastener at the outer end of each axle to hold said large wheels in position, whereby the luggage case may be moved on said large wheels with the small wheels in place on said mounting blocks.

3. A luggage case with small wheels and removable large wheels according to claim 2 in which the exterior of said luggage case is provided with an outside pocket for storage of said large wheels.

4. In a luggage case provided with small wheels located on mounting blocks at the bottom of said luggage case, the improvement comprising:

a hole drilled in each of said mounting blocks;

a sleeve permanently inserted in each of said holes of said mounting blocks;

an axle inserted in each of said sleeves;

a large wheel removably mountable on each of said axles, each of said large wheels having a molded extension at the hub of sufficient length to prevent the large wheel from contacting the outer edge of said luggage case when installed; and a fastener on the outer end of each of said axles to prevent the large wheels from falling off.

* * * * *